US011209652B2

(12) United States Patent
Schultz et al.

(10) Patent No.: US 11,209,652 B2
(45) Date of Patent: Dec. 28, 2021

(54) LIGHT GUIDE WITH POLARIZATION SEPARATOR FOR DUAL IMAGES

(71) Applicant: Vuzix Corporation, West Henrietta, NY (US)

(72) Inventors: Robert J. Schultz, Victor, NY (US); Paul J. Travers, Honeoye Falls, NY (US)

(73) Assignee: Vuzix Corporation, West Henrietta, NY (US)

( * ) Notice: Subject to any disclaimer, the term of this patent is extended or adjusted under 35 U.S.C. 154(b) by 137 days.

(21) Appl. No.: 16/470,227

(22) PCT Filed: Dec. 13, 2017

(86) PCT No.: PCT/US2017/066194
§ 371 (c)(1),
(2) Date: Jun. 16, 2019

(87) PCT Pub. No.: WO2018/125577
PCT Pub. Date: Jul. 5, 2018

(65) Prior Publication Data
US 2020/0081255 A1    Mar. 12, 2020

Related U.S. Application Data

(60) Provisional application No. 62/440,965, filed on Dec. 30, 2016.

(51) Int. Cl.
*G02B 27/01* (2006.01)
*G02B 3/08* (2006.01)
(Continued)

(52) U.S. Cl.
CPC .......... *G02B 27/0172* (2013.01); *G02B 3/08* (2013.01); *G02B 5/3058* (2013.01); *G02B 5/32* (2013.01);
(Continued)

(58) Field of Classification Search
CPC ............ G02B 27/0172; G02B 27/0944; G02B 27/283; G02B 3/08; G02B 2027/0178; G02F 1/31
(Continued)

(56) References Cited

U.S. PATENT DOCUMENTS 4,948,229 A    8/1990 Soref
5,790,504 A    8/1998 Hayashi et al.
(Continued)

OTHER PUBLICATIONS

International Search Report and Written Opinion for International Patent Application No. PCT/US2017/066194 dated Apr. 13, 2018.

*Primary Examiner* — Collin X Beatty
(74) *Attorney, Agent, or Firm* — Harter Secrest & Emery LLP

(57) ABSTRACT

A beam separator has a composite prism having an external input face and an external output face co-planar to the input face. At least one polarization beam splitter surface is encased within the composite prism and has an edge that defines a boundary between the external input face and the external output face. A first reflective surface is disposed to redirect, along a direction orthogonal to the input face, light of a first polarization that reflects from the at least one polarization beam splitter.

21 Claims, 14 Drawing Sheets

(51) Int. Cl.
  *G02B 5/30* (2006.01)
  *G02B 5/32* (2006.01)
  *G02B 27/09* (2006.01)
  *G02B 27/28* (2006.01)
  *G02F 1/31* (2006.01)

(52) U.S. Cl.
  CPC ....... *G02B 27/0944* (2013.01); *G02B 27/283* (2013.01); *G02F 1/31* (2013.01); *G02B 2027/0178* (2013.01)

(58) Field of Classification Search
  USPC .......................................................... 359/630
  See application file for complete search history.

(56) References Cited

U.S. PATENT DOCUMENTS

| | | |
|---|---|---|
| 6,028,656 A | 2/2000 | Buhrer et al. |
| 8,009,363 B2 | 8/2011 | Kuo et al. |
| 2004/0202415 A1 | 10/2004 | Ohmuro |
| 2004/0217464 A1 | 11/2004 | Denneau et al. |
| 2005/0094534 A1 | 5/2005 | Yoon et al. |
| 2012/0062998 A1 | 3/2012 | Schultz et al. |
| 2015/0103318 A1 | 4/2015 | Lee et al. |
| 2015/0172631 A1 | 6/2015 | Kasahara |
| 2016/0116755 A1 | 4/2016 | Lin |
| 2019/0025589 A1* | 1/2019 | Haddick ............ G02B 27/0018 |

* cited by examiner

LIGHT GUIDE WITH POLARIZATION SEPARATOR FOR DUAL IMAGES

TECHNICAL FIELD

This invention generally relates to electronic displays and more particularly relates to displays that use a planar imaging light guide with a beam separator to provide image-bearing light to a viewer.

BACKGROUND OF THE INVENTION

Head-Mounted Displays (HMDs) are being developed for a range of diverse uses, including military, commercial, industrial, fire-fighting, and entertainment applications. For many of these applications, there is particular value in forming a virtual image that can be visually superimposed over the real-world image that lies in the field of view of the HMD user. Optical imaging light guides convey image-bearing light to a viewer in a narrow space for directing the virtual image to the viewer's pupil and enabling this superposition function.

In such conventional imaging light guides, substantially collimated, relatively angularly encoded light beams from an image source are coupled into a planar waveguide by an input coupling such as an in-coupling diffractive optic, which can be mounted or formed on a surface of the planar waveguide or buried within the waveguide. Such diffractive optics can be formed as diffraction gratings, holographic optical elements or in other known ways. For example, the diffraction grating can be formed by surface relief. After propagating along the waveguide, the diffracted light can be directed back out of the waveguide by a similar output grating, which can be arranged to provide pupil expansion along one dimension of the virtual image. In addition, a turning grating can be positioned along the waveguide between the input and output gratings to provide pupil expansion in an orthogonal dimension of the virtual image. The image-bearing light output from the waveguide provides an expanded eyebox for the viewer.

Conventional imaging light guides form a virtual image at optical infinity, conveying only infinity-focused light to the viewer eyebox. However, there can be advantages to forming the virtual image at some close distance, such as in the range from 1 m to 1.5 m, for example. There can be particular benefits to a head-mounted optical imaging apparatus with an imaging light guide that forms both a conventional virtual image at infinity and another virtual image at a near distance from the viewer. At the same time, the apparatus should provide good visibility of the real-world scene that lies in the viewer's field of view. Solutions that have been proposed for providing this feature include bulky designs that require multiple image-forming components and employ complex timing schemes in order to present both near field-focused and infinity-focused images.

In order to provide two separate images to the viewer, multiple image sources could be used. However, this type of solution can be difficult to implement in a lightweight, wearable viewing apparatus. Thus, there would be advantages to a solution that employs a single image source for providing dual image content, with each image at a different focus, such as for both near field and infinity-focused image content.

SUMMARY OF INVENTION

It is an object of the present disclosure to advance the art of virtual image presentation when using compact head-mounted devices and similar imaging apparatus. Advantageously, embodiments of the present disclosure provide an optical imaging apparatus using two or more light guides to form virtual images both at infinity and at near-field focus, while allowing visibility of the real-world scene content of the view.

These and other aspects, objects, features and advantages of the present invention will be more clearly understood and appreciated from a review of the following detailed description of the preferred embodiments and appended claims, and by reference to the accompanying drawings.

According to an aspect of the present disclosure, there is provided a beam separator including a composite prism having an external input face and an external output face co-planar to the input face. At least one polarization beam splitter surface is encased within the composite prism and has an edge that defines a boundary between the external input face and the external output face. A first reflective surface is disposed to redirect, along a direction orthogonal to the input face, light of a first polarization that reflects from the at least one polarization beam splitter.

According to an alternate aspect of the present disclosure, there is provided an imaging apparatus including a projector apparatus that projects a beam of light in a first direction, the beam having a first portion of a first polarization that forms a first image and a second portion of a second polarization, orthogonal to the first polarization, that forms a second image. A first beam expander is located in the path of the projected light beam traveling in the first direction and further in the path of the first portion of the beam that is reflected in the reverse direction. The first beam expander is further configured to direct the reflected light forming the first portion of the beam to form a first virtual image to a viewer. A second beam expander is located in the path of the projected light beam and further in the path of the second portion of the beam that is reflected in the reverse direction and is configured to direct the light forming the second image to the viewer to form a second virtual image to the viewer. A beam separator includes a polarization beam splitter and reflective surfaces that direct both first and second portions of the projected beam back in a second direction opposite the first direction and towards the first and second beam expanders. Both of the first and second beam expanders lie between the projector and the beam separator.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings.

DETAILED DESCRIPTION OF THE INVENTION

Figure 1:
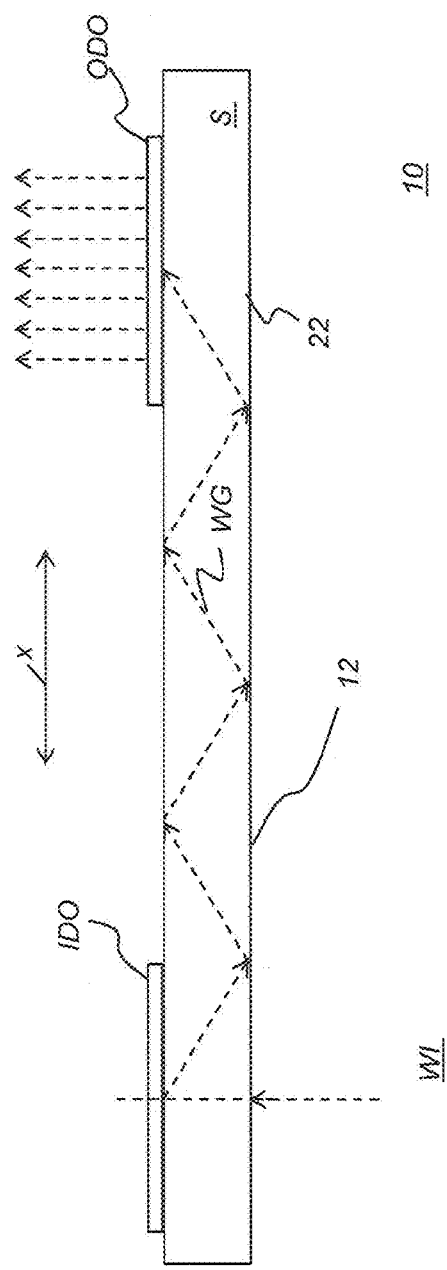
FIG. 1 is a schematic diagram that shows a simplified cross-sectional view of a diffractive beam expander.

The present description is directed in particular to elements forming part of, or cooperating more directly with, apparatus in accordance with the invention. It is to be understood that elements not specifically shown or described may take various forms well known to those skilled in the art.

Where they are used herein, the terms "first", "second", and so on, do not necessarily denote any ordinal, sequential, or priority relation, but are simply used to more clearly distinguish one element or set of elements from another, unless specified otherwise.

In the context of the present disclosure, the terms "viewer", "operator", "observer", and "user" are considered to be equivalent and refer to the person who wears and views images using the HMD viewing device.

As used herein, the term "energizable" relates to a device or set of components that perform an indicated function upon receiving power and, optionally, upon receiving an enabling signal.

The term "actuable" has its conventional meaning, relating to a device or component that is capable of effecting an action in response to a stimulus, such as in response to an electrical signal, for example.

The term "set", as used herein, refers to a non-empty set, as the concept of a collection of elements or members of a set is widely understood in elementary mathematics. The term "subset", unless otherwise explicitly stated, is used herein to refer to a non-empty proper subset, that is, to a subset of the larger set, having one or more members. For a set S, a subset may comprise the complete set S. A "proper subset" of set S, however, is strictly contained in set S and excludes at least one member of set S.

In the context of the present disclosure, the terms "wavelength band" and "wavelength range" are equivalent and have their standard connotation as used by those skilled in the art of color imaging and refer to a continuous range of light wavelengths that are used to represent polychromatic images. Different wavelength bands are directed through different color channels, such as to provide red, green, and blue primary colors in conventional color imaging applications.

As an alternative to real image projection, an optical system can produce a virtual image display. In contrast to methods for forming a real image, a virtual image is not formed on a display surface. That is, if a display surface were positioned at the perceived location of a virtual image, no image would be formed on that surface. Virtual image display has a number of inherent advantages for augmented reality presentation. For example, the apparent size of a virtual image is not limited by the size or location of a display surface. Additionally, the source object for a virtual image may be small; a magnifying glass, as a simple example, provides a virtual image of its object. In comparison with systems that project a real image, a more realistic viewing experience can be provided by forming a virtual image that appears to be some distance away. Providing a virtual image also obviates any need to compensate for screen artifacts, as may be necessary when projecting a real image.

The phrase "optical infinity" as used herein corresponds to conventional usage in the camera and imaging arts, indicating image formation using substantially collimated light, so that the focus distance exceeds at least about 8-10 m.

In the context of the present disclosure, the term "coupled" is intended to indicate a physical association, connection, relation, or linking, between two or more components, such that the disposition of one component affects the spatial disposition of a component to which it is coupled. For mechanical coupling, two components need not be in direct contact, but can be linked through one or more intermediary components. A component for optical coupling allows light energy to be input to, or output from, an optical apparatus. The terms "beam expander" and "pupil expander" are considered to be synonymous, used interchangeably herein.

A composite prism is formed from two or more component prism elements that are glued or otherwise coupled together, including those in optical contact, and including composite elements that are mechanically coupled but have a thin gap at the interface between them, wherein the gap is a fixed distance and is filled with air or epoxy, for example.

FIG. 1 is a schematic diagram that shows a simplified cross-sectional view of one conventional configuration of a monocular type diffractive beam expander or exit pupil expander 10 formed as an imaging light guide 22 comprising an input coupling element such as an in-coupling diffractive optic IDO, and an output coupling element, such as an out-coupling diffractive optic ODO arranged on a transparent and planar waveguide or imaging light guide substrate S, alternately termed pupil expander substrate S. In this example, in-coupling diffractive optic IDO is shown as a reflective type diffraction grating; however, in-coupling diffractive optic IDO could alternately be a transmissive diffraction grating, volume hologram or other holographic diffraction element, or other type of optical component that provides diffraction for the incoming, image-bearing light, arranged on a lower surface 12 of the pupil expander substrate S, where the in-coming light beam WI first interacts with the pupil expander substrate S.

When used as a part of a virtual display system, in-coupling diffractive optic IDO couples the in-coming image-bearing light beam WI from an imager, via suitable front end optics (not shown), into the substrate S of imaging light guide 22. The input light is diffracted by in-coupling diffractive optic IDO. A portion of the first order diffracted light forms an imaging light guided light wave WG that propagates along the substrate S, moving toward the right in the FIG. 1 system, toward out-coupling diffractive optic ODO. Between gratings or other types of diffractive elements, light is channeled or directed through the imaging light guide by Total Internal Reflection (TIR). Out-coupling diffraction element ODO contributes to beam expansion, along the x-axis in the view of FIG. 1, and couples the light that it receives through substrate S, directing the light outwards, towards the observer.

Figure 2:
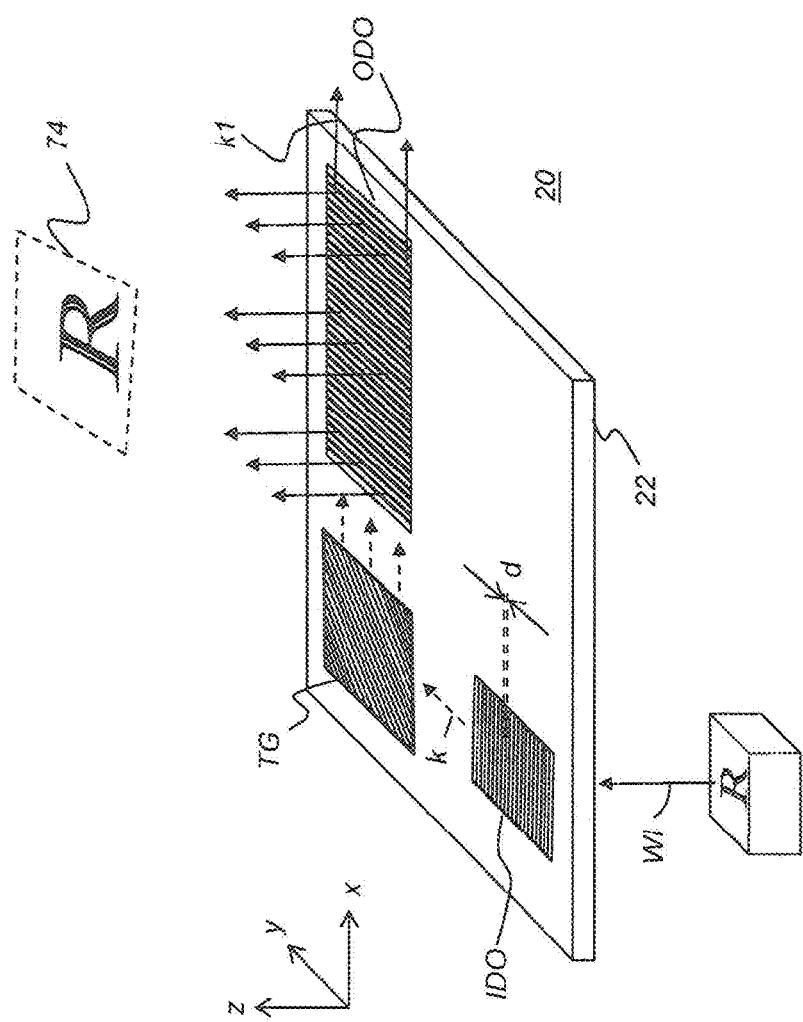
FIG. 2 is a perspective view that shows a diffractive beam expander with a turning grating.

The perspective view of FIG. 2 shows a conventional beam expander 20 that is configured as an imaging light guide and that provides beam expansion along x- and y-axes of the intended image using an intermediate turning grating TG to redirect the light output (first diffracted mode) from in-coupling diffractive optic IDO to out-coupling diffractive optic ODO according to the TG grating vector.

In the FIG. 2 device, in-coupling diffractive optic IDO containing periodic rulings with a period d, receives incoming input optical beam WI representing one of a plurality of pixel generated by an image source 16. A full range of angularly encoded beams for producing a virtual image can be generated by a real display together with focusing optics, by a beam scanner for more directly setting the angles of the beams, or by a combination such as a one-dimensional real display used with a scanner. Beam expander 20 provides an expanded output beam from out-coupling diffractive optic ODO by using intermediate grating TG. Intermediate grating TG provides beam expansion in the y-axis direction and has an angular orientation of diffractive optics and a spacing geometry determined by spacing period d periodicity and the difference in angle of the diffraction features between diffractive optic IDO and diffractive optic ODO.

In considering a light guide design used for imaging it should be noted that image-bearing light traveling within a imaging light guide such as a conventional waveguide is effectively encoded by the in-coupling optics, whether the in-coupling mechanism uses gratings, holograms, prisms, mirrors, or some other mechanism. Any reflection, refraction, and/or diffraction of light that takes place at the input must be correspondingly decoded by the output in order to re-form the virtual image that is presented to the viewer. Out-coupling diffractive optic ODO directs the image-bearing light to an eyebox, shown schematically as eyebox 74 in FIG. 2. The letter "R" represents the orientation of the virtual image that is formed so that it is visible to the viewer whose eyes are in proximity to eyebox 74.

A turning grating TG, placed at an intermediate position between the input and output diffraction elements, is typically chosen so that it does not induce any change on the encoded light. If, for example, the pitch of the turning grating matches the input and output diffraction elements, it is oriented at 60 degrees to the input and output diffraction elements in such a way that the encoded ray bundles are turned 120 degrees by one of the 1st reflection orders of the diffraction elements. This diffraction only acts on the vector component of the incoming rays that are parallel to the grating vector of the turning grating TG. This is evident by the fact that such turning gratings redirect ray bundles within the guide substrate, but do not change the encoded angular information of the virtual image. The resultant virtual image in such a designed system is not rotated. Further, if such a system did introduce any rotation to the virtual image, it would do so non-uniformly across different field angles and wavelengths of light, thus causing unwanted distortions or chromatic aberrations in the resultant virtual image.

The use of turning grating TG provides an inherent geometrical accuracy to the design of beam expander 20 so that the input beam and output beam are symmetrically oriented with respect to each other. With proper grating TG spacing and orientation, grating vectors k direct the light from the in-coupling diffractive optic IDO to the out-coupling diffractive optic ODO with grating vector k1. Grating vectors extend in a direction that is normal to the grooves of the diffraction grating and with a magnitude inverse to the pitch (distance between grooves). Image symmetry is shown for an image of the letter 'R' in FIG. 2. It should be noted that the image that is formed for the imaging light guide viewer is a virtual image, typically focused at infinity, but with the relative orientation of output image content to input image content as represented in FIG. 2. A change in the rotation about the z axis or angular orientation of incoming light wave WI with respect to the x-y plane causes a corresponding symmetric change in rotation or angular orientation of outgoing light from out-coupling diffractive optic (ODO). From the aspect of image orientation, turning grating TG simply acts as a type of optical relay, providing magnification along one axis of the image that is input at in-coupling diffractive optic IDO to out-coupling diffractive optic (ODO). Turning grating TG is typically a slanted or square grating or, alternately, can be a blazed grating.

Beam expansion in two different dimensions is provided when using the arrangement of FIG. 2. Turning grating TG expands the diffracted beam from in-coupling diffractive optic IDO in the y direction as shown. Out-coupling diffractive optic ODO further expands the diffracted beam in the x direction, orthogonal to the y direction as shown.

The conventional imaging light guide beam expander 20 that is shown in FIGS. 1 and 2 is used in a number of existing head-mounted device (HMD) designs for providing image content to a viewer. This type of beam expander is particularly well-suited to augmented reality applications in which image content can be superimposed on a real-world view as seen through the transparent imaging light guide.

Figure 3:
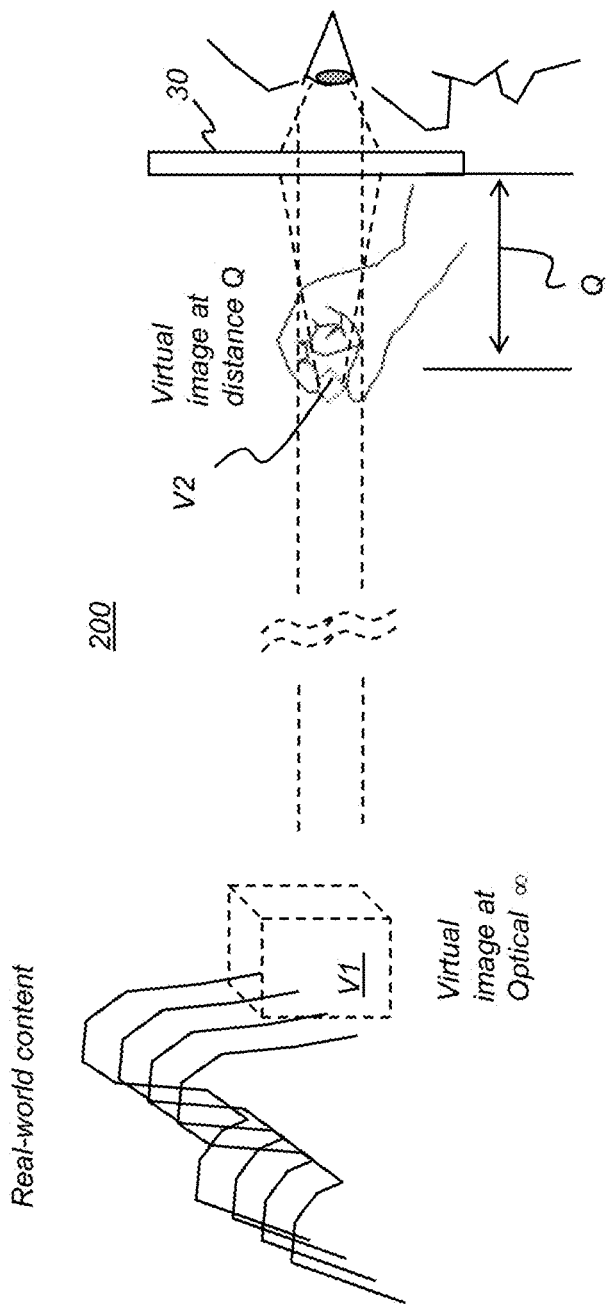
FIG. 3 is a perspective view that shows a dual imaging apparatus having a beam expander that forms two virtual images at different focal distances

Conventional beam expanders using an imaging light guide form a virtual image that appears at optical infinity focus. It has been recognized that there can be advantages in forming additional virtual image content that appears to be at a shorter focus distance. Referring to the schematic diagram in FIG. 3, there is shown a dual imaging apparatus 200 having a beam expander 30 that forms two virtual images: an infinite focused or far-field virtual image V1 at infinity, and a near field virtual image at a finite focal distance Q, such as at 0.6 m from the beam expander 30, for example. This dual-image system allows the viewer to view both far-field (infinity) and near-field visible scene content for different images, along with ambient real-world image content. The visible scene content or real-world image content, also termed the ambient view, is visible to the viewer in an augmented reality system.

Figure 4A:
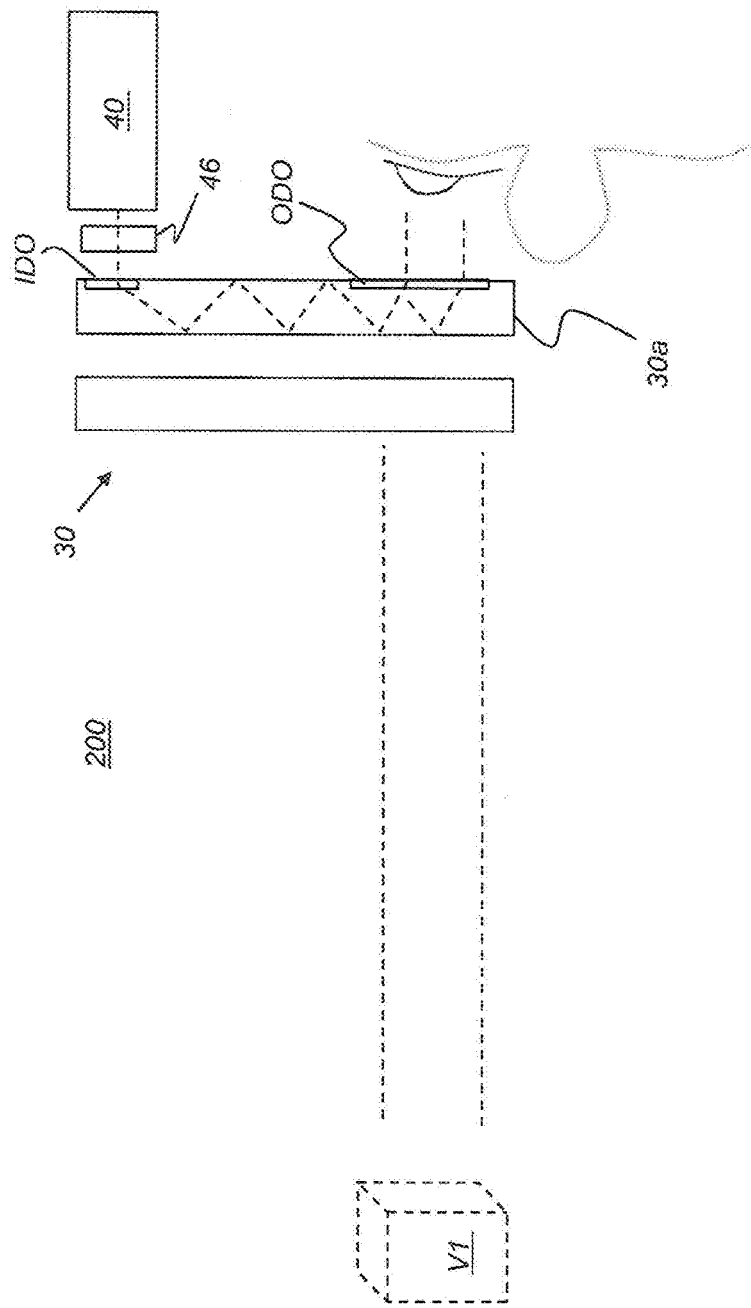
FIGS. 4A and 4B are schematic diagrams of portions of a dual imaging apparatus that show, in simplified form, the two different optical paths for infinity focus and near-field virtual images, respectively.
Figure 4B:
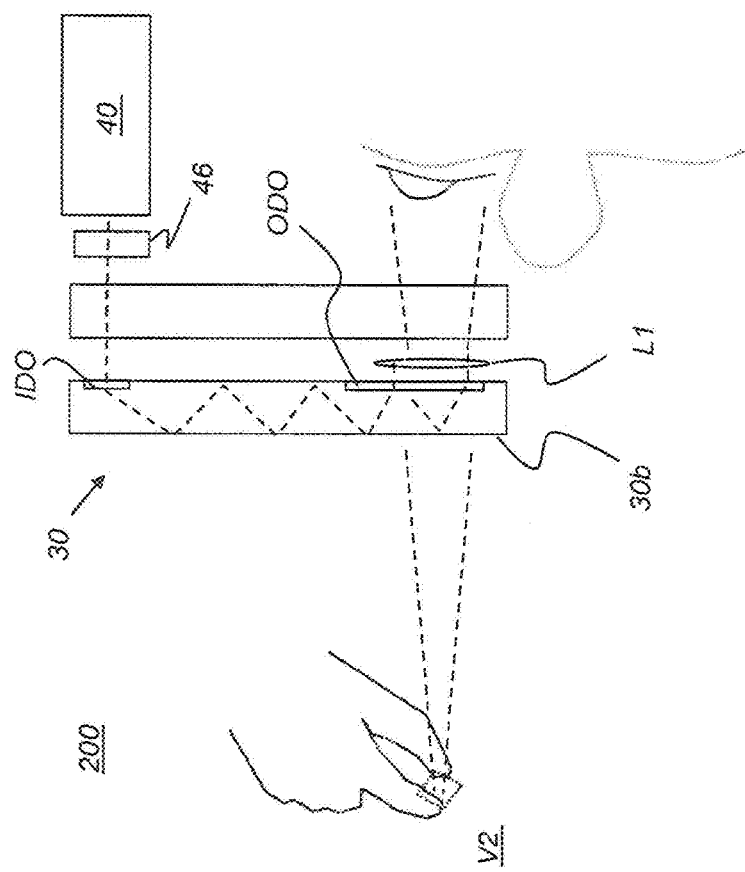

FIGS. 4A and 4B are schematic diagrams of portions of dual imaging apparatus 200 that show, in simplified form, the two different optical paths for infinity focus and near-field virtual images, respectively. For the infinity focused image of FIG. 4A, a projector 40 directs infinity-focused light of a first polarization state into a beam expander 30a through incoupling diffractive optic IDO. This light is conveyed to outcoupling diffractive optic ODO, as described with reference to FIGS. 1 and 2, to form the virtual image V1 at optical infinity. An optional polarization switch 46, which may be internal to projector 40 or external, such as a liquid crystal switchable polarizer, can be used for cyclically changing the polarization state of the projected light between near- and far-field image content, in synchronization with projector 40. One example of an optical polarization switch is given in U.S. Pat. No. 6,028,656 to Buhrer et al.

The near-field focused image is formed in similar fashion as shown more particularly in FIG. 4B. Projector 40 directs infinity-focused light of a second polarization state, orthogonal to the first polarization state, into a beam expander 30b that conveys the light from IDO to ODO to provide the near-field image content at a focal plane, that is, at a non-infinity focal plane. By way of example, the near-field image content can be at a focal plane that is nominally at 0.6 m or that is within 4 m or within 2 m or less from the viewer. Both images can be at different non-infinity focal planes. Additional optics, shown schematically as a lens L1 in the simplified schematic of FIG. 4B, are used to provide the alternate near-field focus for the generated near-field virtual image V2. The function of lens L1 can be provided in any of a number of ways, as described in more detail subsequently.

Figure 5:
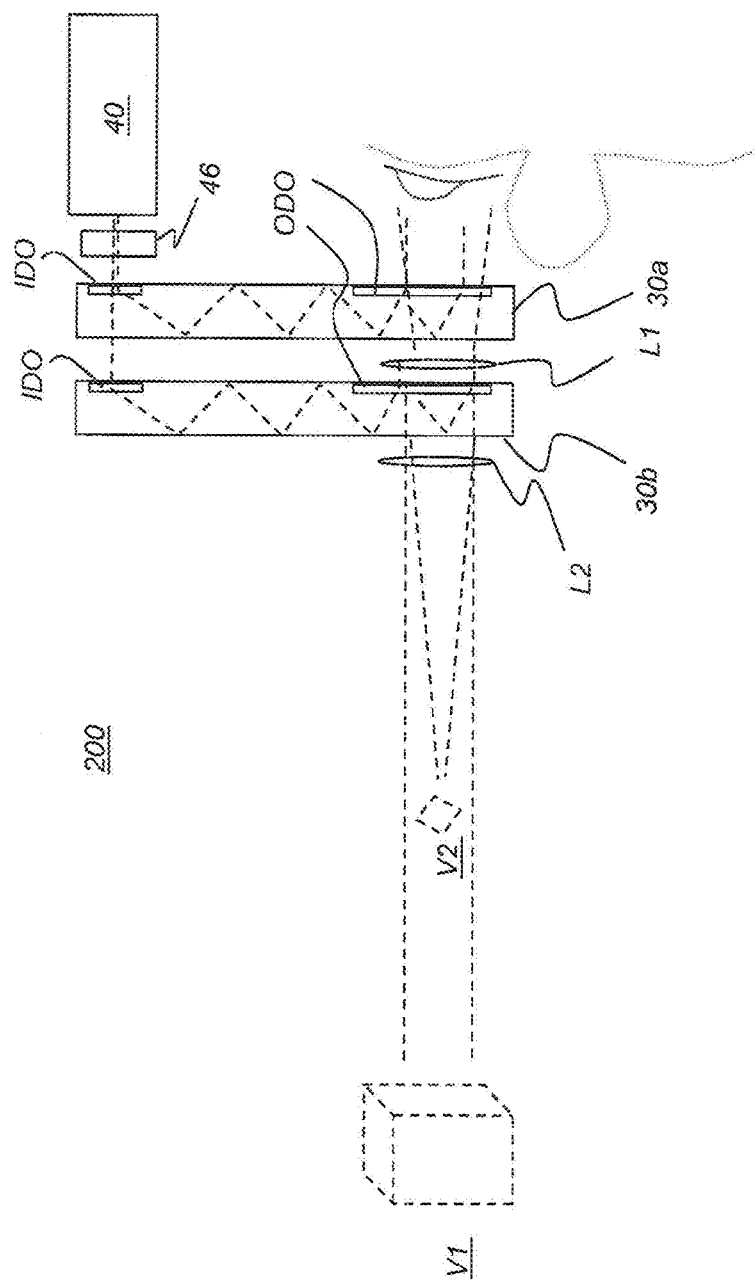
FIG. 5 is a schematic diagram that shows a dual imaging apparatus with two optical paths.

The schematic diagram of FIG. 5 shows dual imaging apparatus 200 with both optical paths overlaid on each other, one path for infinity focus for virtual image V1 using beam expander 30a using light of the first polarization, the other for near-field focus for virtual image V2 using beam expander 30b from light of the second polarization. An additional optional optic, shown as lens L2, helps to correct for distortion to the ambient view or visible scene content that would otherwise be caused by lens L1. Additional lenses can also be provided, such as vision correcting lenses for the viewer. Lenses can be Fresnel lenses or holographic lenses, advantaged over conventional glass lenses by being uniformly thin.

It should be noted that both images can be infinity-focused or, alternately, focused at a focal plane.

Embodiments of the present disclosure can use a single projector for forming both near- and far-field image content, using projected light that is cyclically alternated between a first polarization and a second polarization that is orthogonal to the first polarization.

Figure 6:
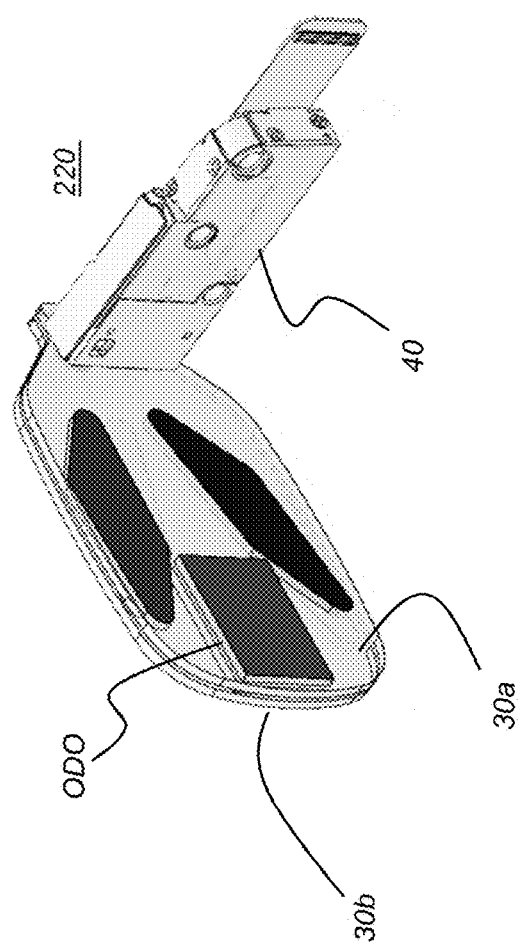
FIG. 6 is a rear perspective view that shows a dual image apparatus having a single projector.

FIG. 6 is a rear perspective view that shows a dual image apparatus 220 having a single projector 40. Projector 40 is oriented to lie flat along the temple of the viewer when the apparatus 220 is worn. A composite prism acts as a beam separator 50 for splitting the projected beam into its separate parts for images V1 and V2 according to polarization axis, as described in more detail subsequently.

Figure 7:
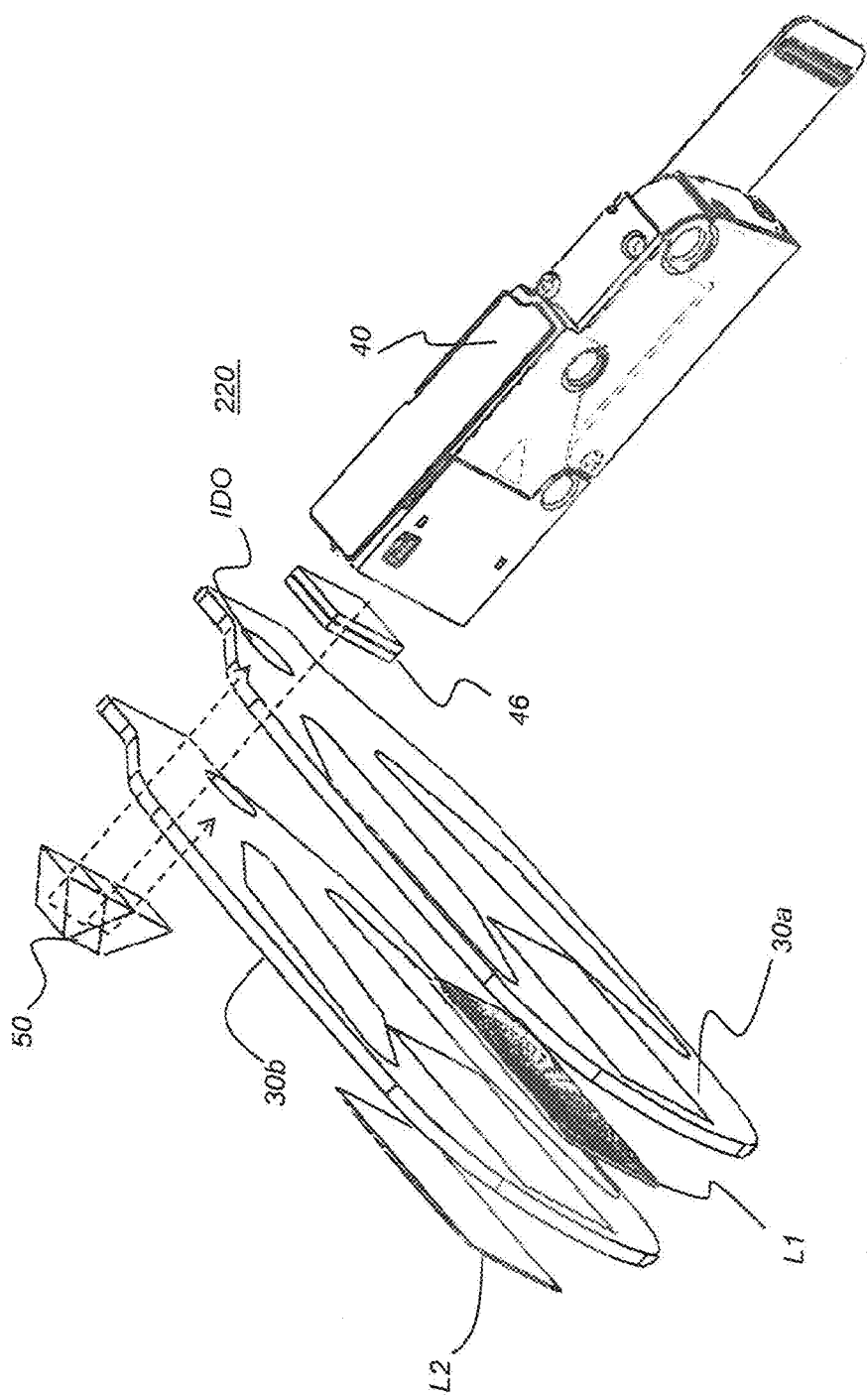
FIG. 7 is an exploded view that shows features of an imaging apparatus for forming two images at different focal lengths.
Figure 8:
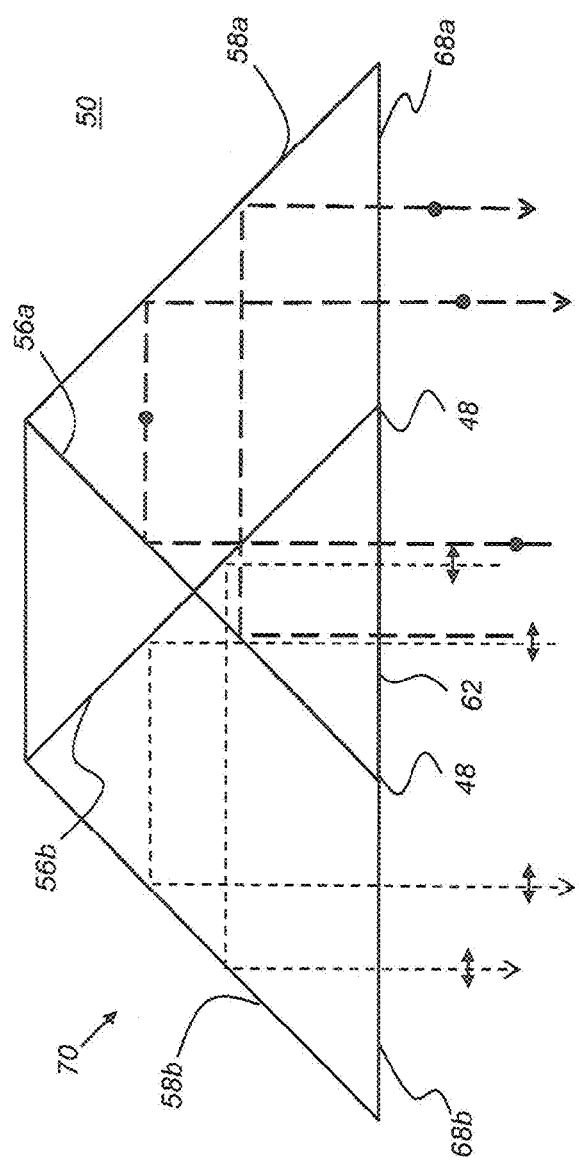
FIG. 8 is a schematic view showing image splitting light redirection by the beam separator for polarized light.

FIG. 7 is an exploded view that shows features of an imaging apparatus for forming two images at different focal lengths. Dashed lines indicate the paths of light generated from projector 40. Projector 40 directs light in a first direction, forward or left-ward as shown in the example of FIG. 7. Beam separator 50 splits this projected light into two portions according to polarization axis and directs each portion backward, in the direction opposite the forward or projection direction. The portion intended for forming the far-field or infinity focused image is directed to the IDO on beam expander 30a. The portion intended for forming the near-field focused image at a non-infinity focal plane, or other image at any useful focal distance, is directed back to the corresponding IDO on beam expander 30b.

FIGS. 8, 9, 10, 11, and 12 show how beam separator 50 is formed using a composite prism 70 and how it functions to separate light content using polarization for the two virtual images V1 and V2. In the schematic diagram of FIG. 8, beam separator 10 has crossed polarizers 56a and 56b that transmit or reflect incident light according to its polarization state. Polarizers are encased within the composite prism 70. Polarizer 56a transmits p-polarized light and reflects s-polarized light. In the example shown, polarizer 56b transmits s-polarized light and reflects p-polarized light. The opposite behavior for beam splitter surfaces could alternately be used, with reflection of the s-polarized light from surface 56a and transmission of p-polarized light from polarizer surface 56b.

Reflective surfaces 58a and 58b redirect incident light to output surfaces 68a and 68b, respectively. The light from output surface 68a, exiting centered about a normal to the output surface, goes to the IDO on one beam expander; light exiting from output surface 68b, also centered about a normal, goes to the other beam expander. Output faces of surfaces 68a and 68b are coplanar with incident surface 62, with boundaries between incident and output faces defined along the edges 48 of the respective polarizer surfaces.

Figure 9:
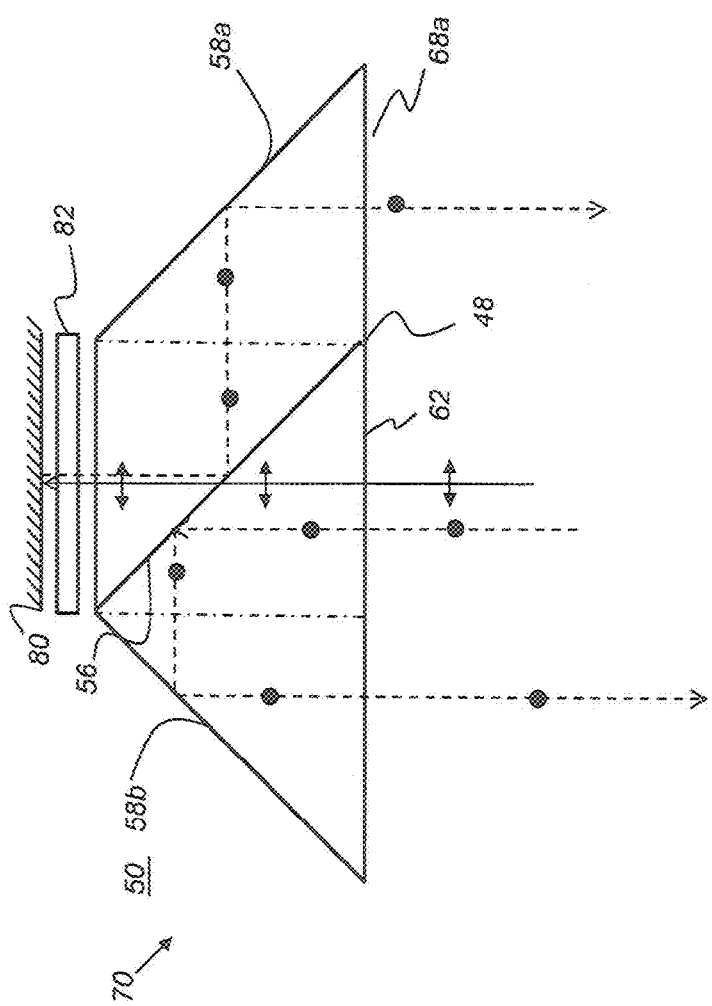
FIG. 9 is a side view of that shows the arrangement of a composite prism for beam separation according to an alternate embodiment of the present disclosure.
Figure 10:
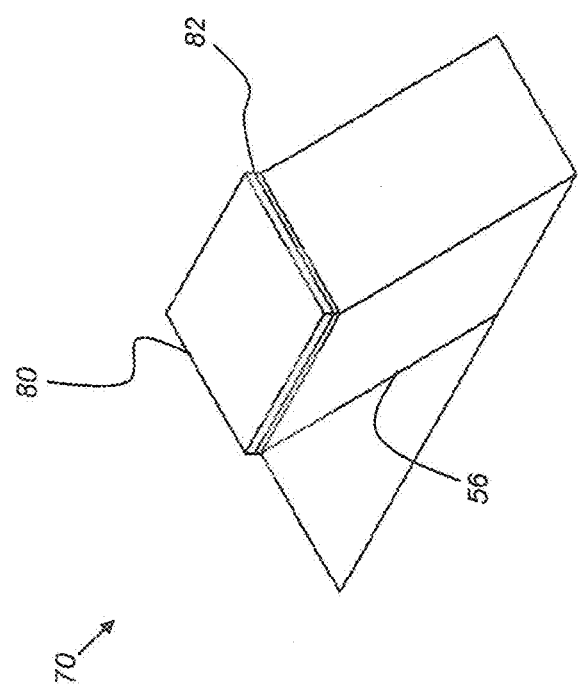
FIG. 10 is a perspective view that shows the composite prism of FIG. 9.

The side view of FIG. 9 and perspective view of FIG. 10 show beam separator 50 formed using a composite prism according to an alternate embodiment of the disclosure. A polarizer 56 lies at the interface of two component prisms, with edge 48 that defines a boundary between the input face, incident surface 62, and coplanar output face, surface 68a. Light of s-polarization reflects from polarizer 56 and is, in turn, reflected from reflective surface 58b for direction toward the corresponding beam expander. Light of p-polarization transmits through polarizer 56 and goes through a quarter wave plate 82 and to a reflective surface, shown as mirror 80, which reflects the light back through quarter wave plate 82. After transiting the quarter wave plate 82 retarder twice, this reflected light, previously p-polarized, is now s-polarized light. This light reflects from polarizer 56 and from surface 58a, exiting surface 68a toward the IDO on a corresponding beam expander.

Figure 11:
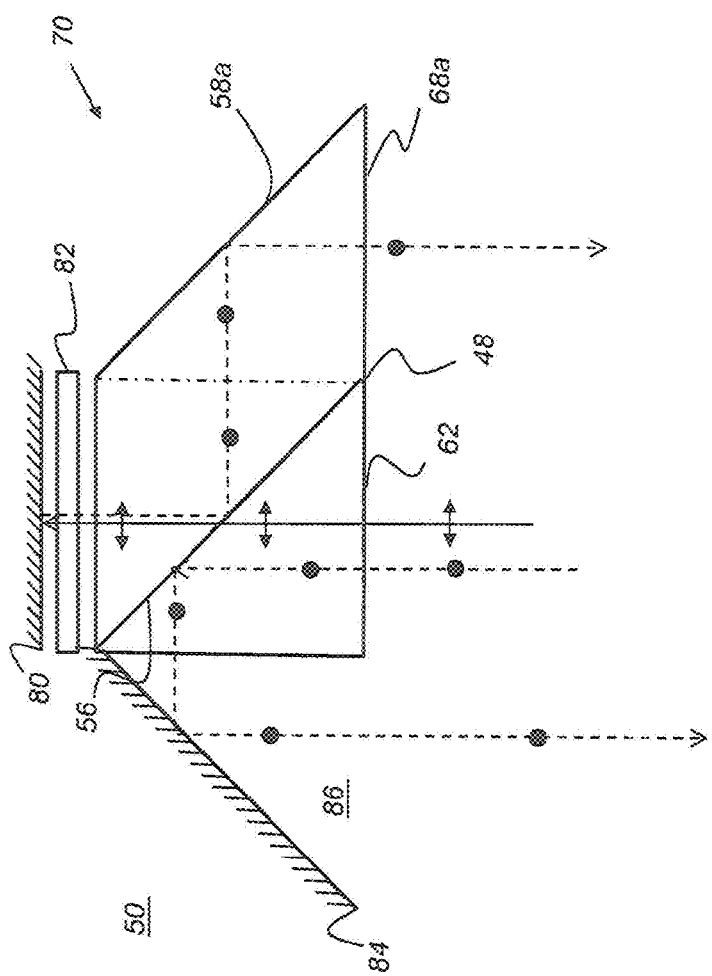
FIG. 11 is a side view that shows an alternate embodiment of the beam separator.
Figure 12:
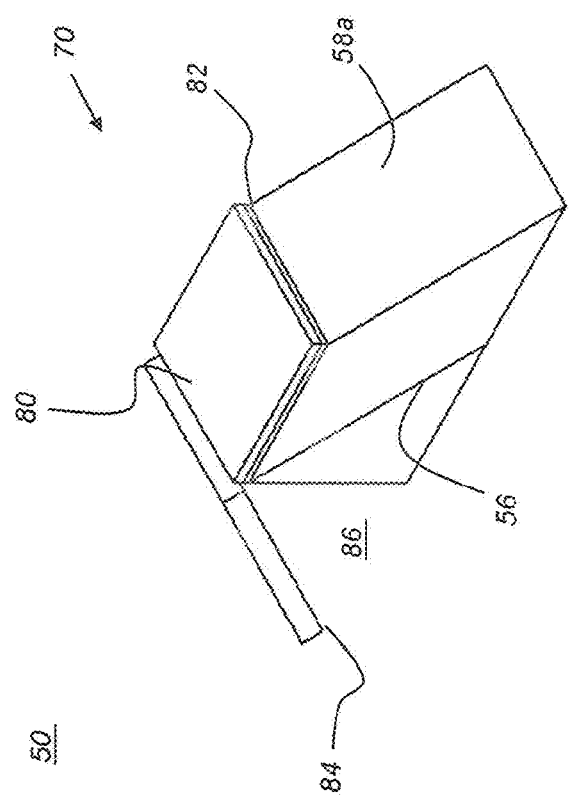
FIG. 12 is a perspective view that shows the composite prism of FIG. 11.

One difficulty with the FIG. 9 solution relates to the difference in optical path length between the different polarized light beams for the two images. The alternate embodiment of FIGS. 11 and 12 show one solution that corrects for this path length disparity. An air space 86 is provided over a portion of the optical path between polarizer 56 and the reflective surface of a mirror 84 that redirects polarized light as shown. Polarizer 56 is encased within composite prism 70 and extends to the surface, defining a boundary between incident input surface 62 and coplanar output surface 68a.

Figure 13:
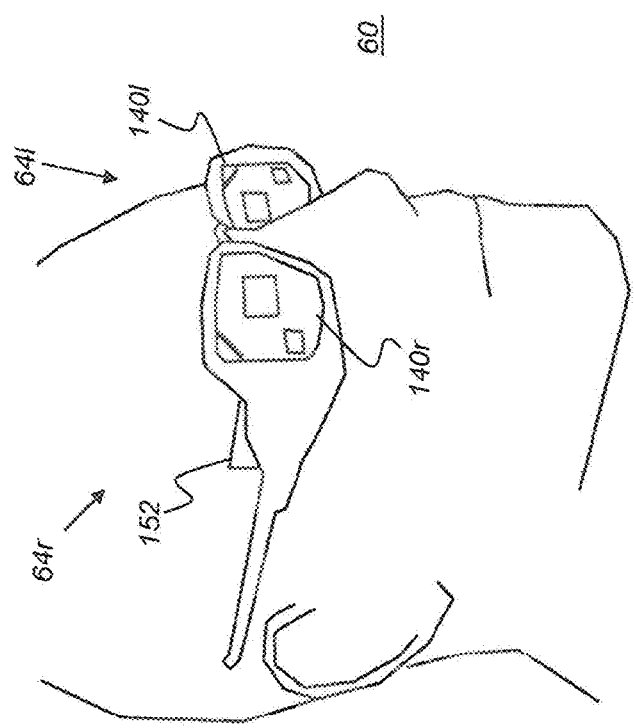
FIG. 13 is a perspective view that shows a display system for augmented reality viewing using imaging light guides of the present disclosure.

The perspective view of FIG. 13 shows a display system 60 for three-dimensional (3-D) augmented reality viewing using a pair of imaging light guides of the present disclosure. Display system 60 is shown as an HMD with a left-eye optical system 64l having a beam expander 140l for the left eye and a corresponding right-eye optical system 64r having a beam expander 140r for the right eye. An image source 152, such as a picoprojector or similar device, can be provided, energizable to generate a separate image for each eye, formed as a virtual image with the needed image orientation for upright image display. The images that are generated can be a stereoscopic pair of images for 3-D viewing. The virtual image that is formed by the optical system can appear to be superimposed or overlaid onto the real-world scene content seen by the viewer. Additional components familiar to those skilled in the augmented reality visualization arts, such as one or more cameras mounted on the frame of the HMD for viewing scene content or viewer gaze tracking, can also be provided. Alternate arrangements are possible, including a display apparatus for providing an image to one eye.

Beam Expander Fabrication

In-coupling and out-coupling diffractive optics IDO and ODO can be diffraction gratings or formed as volume holograms, or formed from a holographic polymer dispersed liquid crystal, for example. The waveguide substrate S of the beam expander is typically glass or other optical material with sufficient index of refraction for supporting TIR transmission between in-coupling diffractive optic, distribution gratings, and out-coupling diffractive optic.

In-coupling diffractive optics IDO, distribution gratings, and out-coupling diffractive optics ODO can have different grating periods appropriate to their functions. After proper surface preparation of a glass substrate blank, the diffraction components can formed on one or both outer surfaces of the beam expander using nano-imprinting methods, for example. At least one of the in-couplings and out-couplings can be a surface relief diffraction grating.

The polarization beam splitter can be a conventional polarizer or a wire grid polarizer, such as a polarizer from Moxtek, Orem UT.

The invention has been described in detail with particular reference to presently preferred embodiments, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. An imaging apparatus comprising:
a projector that projects a beam of light in a first direction, the beam having a first portion with a first polarization that forms a first image and a second portion with a second polarization that forms a second image;
a first beam expander in the path of the projected light beam traveling in the first direction and further in the path of the first portion of the beam that is reflected in a first reverse direction, wherein the first beam expander is further configured to direct the reflected light forming the first portion of the beam to form a first virtual image to a viewer;
a second beam expander in the path of the projected light beam and further in the path of the second portion of the beam that is reflected in a second reverse direction, and configured to direct the light forming the second portion of the beam to form a second virtual image to the viewer; and
a beam separator that comprises a polarization beam splitter and reflective surfaces that direct both first and second portions of the projected beam back in the respective first and second reverse directions towards the first and second beam expanders, wherein both of the first and second beam expanders lie between the projector and the beam separator.

2. The apparatus of claim 1 wherein the first beam expander further comprises a first diffractive input optic disposed in the path along the first reverse direction of reflected light from the beam separator and the second beam expander further comprises a second diffractive input optic disposed in the path along the second reverse direction of reflected light from the beam separator.

3. The apparatus of claim 1 further comprising one or more lenses disposed between the first and second beam expanders in the path of the light forming the second virtual image so that the first and second virtual images are formed at different distances from the viewer.

4. The apparatus of claim 1 wherein the polarization beam splitter is a wire-grid polarizer.

5. The apparatus of claim 1 wherein the beam separator further comprises a quarter-wave plate and a reflector for returning one of the first and second portions of the projected beam back to the polarizing beam splitter with an altered polarization.

6. The apparatus of claim 5 further comprising a polarization switch in the path of projected light.

7. The apparatus of claim 6 wherein the polarization switch is a liquid crystal switchable polarizer.

8. The apparatus of claim 1 further comprising first and second lenses for focusing light from a visible scene.

9. The apparatus of claim 8 wherein the first and second lenses are Fresnel lenses.

10. The apparatus of claim 8 wherein the first and second lenses are holographic lenses.

11. The apparatus of claim 3 wherein the first virtual image is at an infinity focus.

12. A method comprising:
projecting a beam of light in a first direction, the beam having a first portion of a first polarization that forms a first image and a second portion of a second polarization that forms a second image;
disposing a first beam expander in the path of the projected light beam traveling in the first direction and further in the path of the first portion of the beam that is reflected in a first reverse direction, wherein the first beam expander is further configured to direct the reflected light forming the first portion of the beam to form a first virtual image to a viewer;
disposing a second beam expander in the path of the projected light beam and further in the path of the second portion of the beam that is reflected in a second reverse direction, wherein the second beam expander is further configured to direct the light forming the second image to the viewer to form a second virtual image to the viewer; and
separating the projected beam at a polarization beam splitter and reflecting the light from reflective surfaces that direct both first and second portions of the projected beam back in the respective first and second reverse directions towards the first and second beam expanders, wherein both of the first and second beam expanders lie between the projector and the beam separator.

13. The method of claim 12 wherein the step of projecting the beam of light further comprises directing light through a polarization switcher.

14. The method of claim 12 wherein the projected beam alternates between a first polarization state and a second polarization state that is orthogonal to the first polarization state.

15. The apparatus of claim 1 in which the beam separator further comprises a composite prism having an external input face and an external output face co-planar to the input face, and the polarization beam splitter is encased within the composite prism and has an edge that defines a boundary between the external input face and the external output face.

16. The apparatus of claim 15 in which the composite prism (a) has a first reflective surface as one of the reflective surfaces of the beam separator that is disposed to redirect light that enters the composite prism through the external input face and reflects from the polarization beam splitter en route to the first reflective surface and (b) has a second reflective surface as another of the reflective surfaces of the beam separator that is disposed to redirect light that enters the composite prism through the external input face and initially transmits through the polarization beam splitter en route to the second reflective surface.

17. The apparatus of claim 16 in which the beam separator further comprises a quarter-wave plate and a reflector in the path of light that transmits through the at least one polarization beam splitter, the reflector being disposed to redirect the light that transmits through the polarization beam splitter back through the quarter-wave plate to the polarization beam splitter with an altered polarization for reflecting from the polarization beam splitter toward the second reflective surface.

18. The apparatus of claim 15 in which one of the reflective surfaces of the beam separator is a first reflector that is disposed to redirect light that reflects from the polarization beam splitter en route to the first reflector and the composite prism has a reflective surface as another of the reflective surfaces of the beam separator that is disposed to redirect light that that enters the composite prism through the external input face and initially transmits through the polarization beam splitter en route to the reflective surface of the composite prism.

19. The apparatus of claim 18 in which the beam separator further comprises a quarter-wave plate and a second reflector in the path of light that transmits through the polarization beam splitter, the second reflector being disposed to redirect light back through the quarter-wave plate to the polarization beam splitter with an altered polarization for reflecting from the polarization beam splitter toward the reflective surface of the composite prism.

20. The apparatus of claim 1 in which the beam separator further comprises a composite prism and the polarization beam splitter includes first and second internal polarization beam splitter surfaces, wherein the composite prism has an external input face defined between outer edges of first and second internal polarization beam splitter surfaces.

21. The apparatus of claim 20 in which the composite prism further comprises a first set of external prism surfaces as at least two of the reflective surfaces of the beam separator that are configured to redirect the first portion of the beam through a first output face in a first output direction to the first beam expander and a second set of external prism surfaces as at least two more of the reflective surfaces of the beam separator that are configured to redirect the second portion of the beam through a second output face in a second output direction to the second beam expander.

* * * * *